United States Patent
Li et al.

(10) Patent No.: US 11,735,828 B2
(45) Date of Patent: Aug. 22, 2023

(54) 24-GHZ LOW-COST CONTINUOUS BEAM STEERING PHASED ARRAY FOR INDOOR SMART RADAR AND METHODS RELATING THERETO

(71) Applicant: TEXAS TECH UNIVERSITY SYSTEM, Lubbock, TX (US)

(72) Inventors: Changzhi Li, Lubbock, TX (US); Zhengyu Peng, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 812 days.

(21) Appl. No.: 16/091,399

(22) PCT Filed: Apr. 4, 2017

(86) PCT No.: PCT/US2017/026023
§ 371 (c)(1),
(2) Date: Oct. 4, 2018

(87) PCT Pub. No.: WO2017/176816
PCT Pub. Date: Oct. 12, 2017

(65) Prior Publication Data
US 2019/0157771 A1    May 23, 2019

Related U.S. Application Data

(60) Provisional application No. 62/317,997, filed on Apr. 4, 2016.

(51) Int. Cl.
*H01Q 21/06* (2006.01)
*H01Q 3/28* (2006.01)
(Continued)

(52) U.S. Cl.
CPC .......... *H01Q 21/065* (2013.01); *G01S 7/032* (2013.01); *H01P 1/227* (2013.01); *H01Q 1/007* (2013.01); *H01Q 3/28* (2013.01); *H01Q 3/36* (2013.01)

(58) Field of Classification Search
CPC .......... G01S 7/032; H01Q 1/007; H01Q 3/28; H01Q 3/36; H01Q 21/065; H01P 1/227
See application file for complete search history.

(56) References Cited

U.S. PATENT DOCUMENTS 3,059,234 A    10/1962    Hamel et al.
6,856,284 B1    2/2005    Cangiani
(Continued)

FOREIGN PATENT DOCUMENTS

EP    2950449 A1    2/2015
KR    20110015961 A  *  10/2009

OTHER PUBLICATIONS

Topak, Ali Eray, "A Novel Millimeter-Wave Dual-Fed Phased Array for Beam Steering", Nov. 2013, pp. 39-83.*
(Continued)

*Primary Examiner* — Peter M Bythrow
*Assistant Examiner* — Nazra Nur Waheed
(74) *Attorney, Agent, or Firm* — Dickinson Wright PLLC; Kristopher Lance Anderson

(57) ABSTRACT

Disclosed is a system and method for a 24-GHz phased array for indoor smart radar comprising at least 6 horizontally placed antenna elements as a vertically placed 5-element series-fed microstrip patch array. The beam of the phased array can be continuously steered on the H-plane to different directions through a novel vector control array. Each element can adjust the phase and amplitude of the corresponding element of the horizontally placed linear array. The phased array system of the present invention may be fabri-
(Continued)

cated on a single printed circuit board (PCB), and PIN diodes are used to realize beam steering by modulating the decomposed received signal. In order to compensate for the loss of the vector control array and reduce the noise figure, six low noise amplifiers (LNAs) are also used in the array. The present invention has the ability to continuously steer the beam on the H-plane.

8 Claims, 9 Drawing Sheets

(51) Int. Cl.
*H01Q 3/36* (2006.01)
*H01Q 1/00* (2006.01)
*H01P 1/22* (2006.01)
*G01S 7/03* (2006.01)

(56) References Cited

U.S. PATENT DOCUMENTS

| 8,666,342 | B1* | 3/2014 | Adabi | H01P 1/22 |
| | | | | 455/127.2 |
| 2004/0246193 | A1 | 12/2004 | Carey | |
| 2012/0050094 | A1 | 3/2012 | Nakabayashi et al. | |
| 2012/0050107 | A1 | 3/2012 | Mortazawi et al. | |
| 2012/0114076 | A1 | 5/2012 | Morton et al. | |
| 2012/0146841 | A1* | 6/2012 | Ookawa | H01Q 3/36 |
| | | | | 342/372 |
| 2012/0188917 | A1 | 7/2012 | Knox | |
| 2013/0162350 | A1* | 6/2013 | Son | H03F 1/3241 |
| | | | | 330/124 R |

OTHER PUBLICATIONS

Topak, Ali Eray, "A Novel Millimeter-Wave Dual-Fed Phased Array for Beam Steering", Nov. 2013. (Year: 2013).*
Copenheaver, Blaine R.; International Search Report and Written Opinion; dated Jun. 20, 2017; PCT/US2017/026023; 24 pages.

* cited by examiner

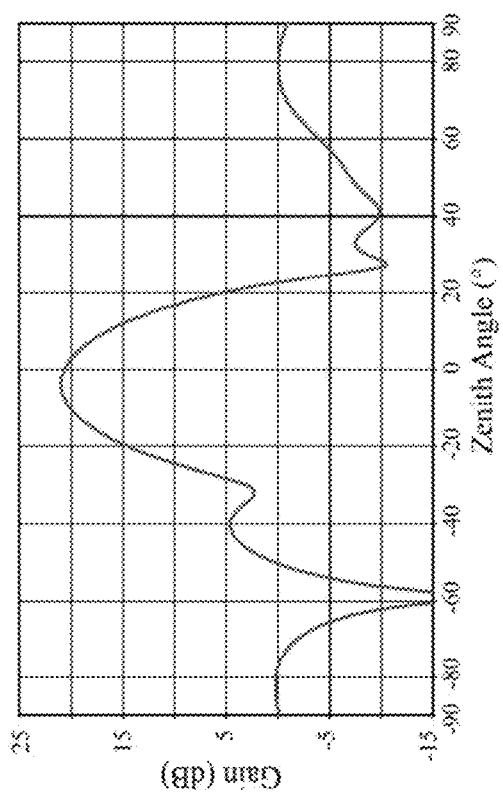
FIG. 7(A)
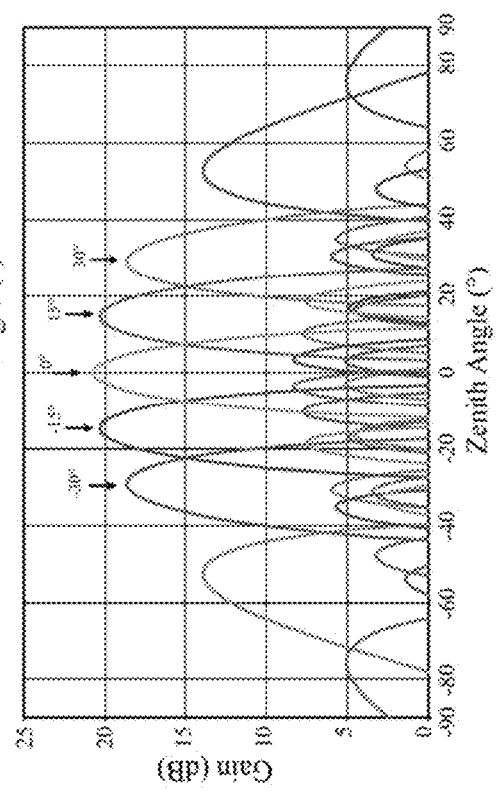
FIG. 7(B)
FIG. 7

24-GHZ LOW-COST CONTINUOUS BEAM STEERING PHASED ARRAY FOR INDOOR SMART RADAR AND METHODS RELATING THERETO

CROSS-REFERENCE TO RELATED APPLICATIONS

This application claims priority to U.S. Patent Appl. Ser. No. 62/317,997, filed Apr. 4, 2016, entitled "24-Ghz Low-Cost Continuous Beam Steering Phased Array For Indoor Smart Radar And Methods Relating Thereto". The foregoing patent application is hereby incorporated herein by reference in its entirety for all purposes.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present invention relates in general to the field of localization and monitoring. In particular, the system provides for electronic subject localization and activity monitoring applications. The disclosed systems and methods support a wide variety of scenarios and includes various products and services.

STATEMENT OF FEDERALLY FUNDED RESEARCH

None.

BACKGROUND OF THE INVENTION

For nearly a century, radar system has been used for imaging, ranging and detection in navigation, space and military applications. Because of the advancement of semiconductor technology and design methodology, in recent years, applications of radar systems have been expended to commercial areas, such as automobile [1], industrial localization [2], and biomedical applications [3]. In many cases, the radar system scans the objects line-by-line or sector-by-sector with a mechanical steering antenna or array. Usually the mechanical steering system will increase the size, weight, and cost. It may also limit the reliability of the entire system. With the heavy and bulky mechanical system, it is difficult to mount the radar on an automobile or medical equipment. One example that needs modern low-profile radar with beam steering capability is tumor tracking for lung cancer radiotherapy, where it is desirable for the biomedical radar mounted on a medical linear accelerator (LINAC) to dynamically steer the beam between the chest and abdomen of the patient to monitor the respiration pattern and track tumor location during radiation therapy [4].

Currently, the conventional phased array is expensive, especially at frequencies higher than 24 GHz. This is mainly because conventional solutions require high frequency phase shifters, which are expensive and have small number of manufacturers.

Moreover, the conventional phased array system has limited flexibilities of beam forming due to its phase shifters, which can only adjust the phase differences among antenna elements.

The current methods to realize the beam scanning or beam forming in array antenna include the conventional phased array and digital beam forming.

The conventional phased array requires high performance phase shifters, which are expensive and have small number of manufacturers at the frequency up to 24 GHz.

The digital beam forming system needs high speed analog to digital converters and high performance digital processing system, as well as complex algorithm, which will make the system expensive and complex.

SUMMARY OF THE INVENTION

Phased-array radar overcomes the drawbacks of mechanical beam steering system. With electrical beam steering, the radar system and can scan a wide sector in milliseconds. However, due to the requirement of high performance phase shifters, the cost of the phased array system is always high, which limits the application of phased array in smart radar system in our daily life. To reduce the total cost of the system and improve the flexibility of the phased array, a horizontally placed 6-element phased array is designed for portable smart radar receivers. The beam on the H-plane can be continuously tuned to different directions using a vector control array. Moreover, with the ability to independently adjust the phase and amplitude of each antenna element, the proposed phased array can also realize more complex beam forming.

It is therefore an object of the present invention to use a vector control array to realize beam scanning, which eliminates the requirement of phase shifters. The cost of the proposed system is significantly reduced compared with a conventional phased array. Moreover, with the ability to independently adjust the phase and amplitude of each antenna element, the proposed phased array can also realize more complex beam forming.

Phased-array radar overcomes the drawbacks of mechanical beam steering system. With electrical beam steering, the radar system can scan a wide sector in milliseconds [5]. Since it is easy to implement phased array radar system on a printed circuit board (PCB), it will have a much lighter weight and lower profile, which enable the radar to be mounted on an automobile without affecting the outline or structure of the automobile. With lighter weight and lower profile, the radar is also much easier to be implemented on medical equipment and installed at home for smart house applications. However, the conventional phased array is expensive, especially at frequencies higher than 24 GHz. This is mainly because conventional solutions require high frequency phase shifters, which are expensive and have a small number of manufacturers.

In one aspect, a 24-GHz horizontally placed 6-element phased array is designed for portable smart radar receivers. The beam on the H-plane can be continuously tuned to different directions using a vector control array. Moreover, with the ability of independently adjusting the phase and amplitude of each antenna element, the proposed phased array can also realize more complex beam forming. Due to the elimination of the requirement of phase shifters, the cost of the proposed system is significantly reduced from a conventional phased array.

In another aspect, the present invention provides a phased array radar, comprising: an antennae array comprising at least six series-fed antennae; a vector controller; and a constant phase shift variable attenuator, further comprising a non-steerable pattern on the E-plane and steerable pattern on the H-plane. The antennae may be five-element series-fed microstrip patch antennae. The vector controller is capable of attenuating amplitude and phase control, and the constant phase shift variable attenuator is a reflection-type attenuator having similar impedance matching at both the input and output. In an another aspect, the present invention further comprises one or more PIN diodes.

It is another object of the present invention to provide a method of controlling a phased array radar, comprising: independently adjusting the phase and amplitude of each antenna element within an antennae array via a vector controller comprising a quadrature power divider, a power combiner, a first attenuator and a second attenuator, wherein both of the first attenuator and the second attenuator are capable of amplitude modulation. The first attenuator and second attenuator maintain a constant phase shift when attenuation changes, and allow for steering the antenna array on the H-plane by adjusting the vector controller In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the present invention will be apparent from the following description of embodiments as illustrated in the accompanying drawings, in which reference characters refer to the same parts throughout the various views. The drawings are not necessarily to scale, emphasis instead being placed upon illustrating principles of the present invention:

FIG. 7(A) depicts a graphical display of the pattern of an array on the E-plane; and FIG. 7(B) depicts a graphical display of the pattern of the array on the H-plan with beam direction tuning.

DETAILED DESCRIPTION OF THE INVENTION

Figure 1:
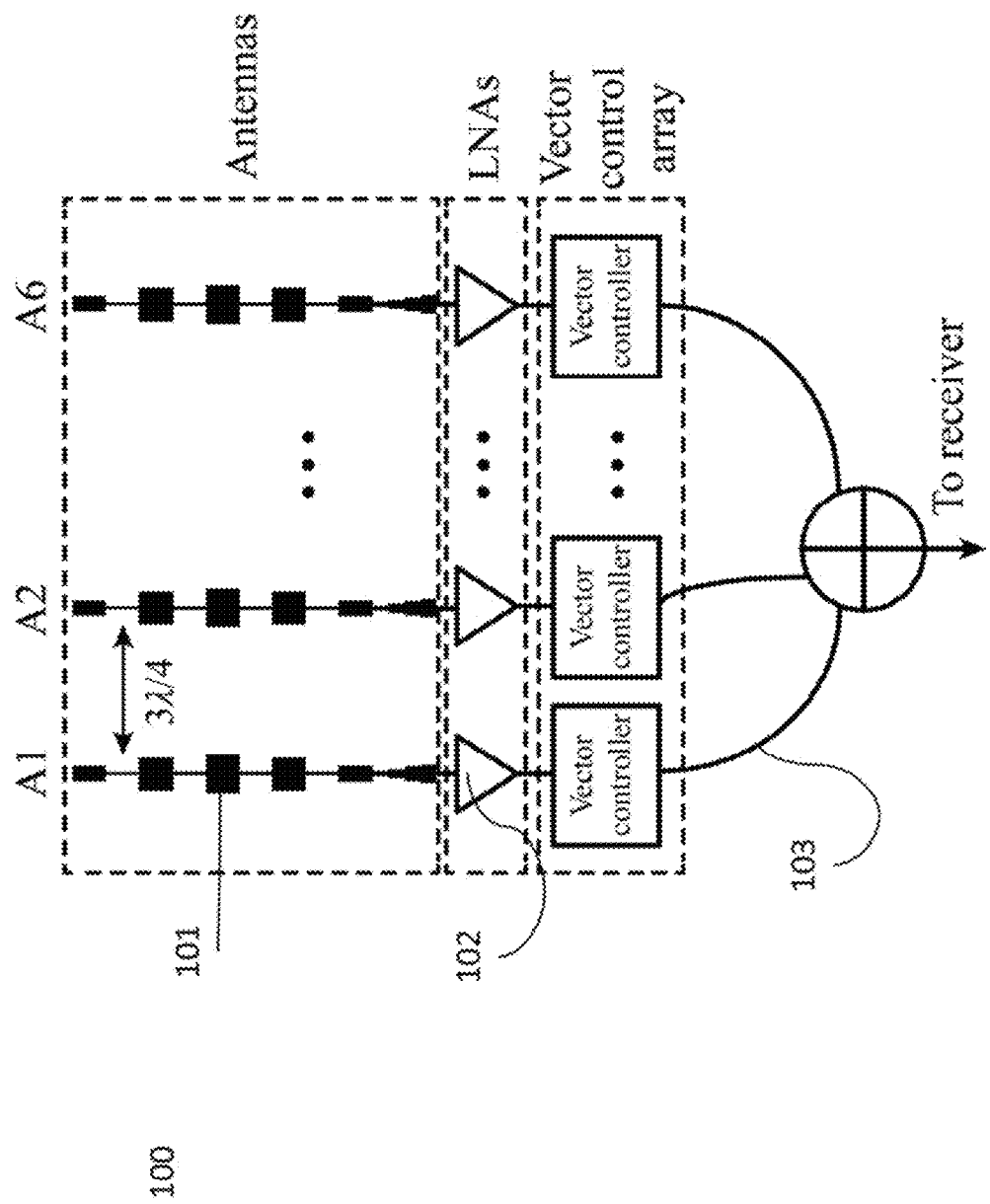
FIG. 1 depicts a schematic of the continuous beam steering phased array of the present invention.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the present invention and do not delimit the scope of the present invention.

All publications and patent applications mentioned in the specification are indicative of the level of skill of those skilled in the art to which the present invention pertains. All publications and patent applications are herein incorporated by reference to the same extent as if each individual publication or patent application was specifically and individually indicated to be incorporated by reference.

The present invention will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present invention is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of the present invention the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, including a software server, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present invention a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of the present invention a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of the present invention, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), North American/CEPT frequencies, radio frequencies, single sideband, radiotelegraphy, radioteletype (RTTY), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of the present invention, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a mobile device may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages. The client device, mobile device, or wireless communication device, in accordance with the present invention may be a portable or mobile telephone, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the present invention to any particular type of communication device. Certain modern handheld electronic devices (UE) comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

The principles discussed herein may be embodied in many different forms. The preferred embodiments of the present invention will now be described where for completeness, reference should be made at least to the Figures.

Thus, based on the above foundational discussion, in addition to the detailed discussion below, the present invention describes systems and methods for a vector-controlled phased-array radar array for indoor smart radar. Unlike mechanically steered radars, which are usually bulky and unreliable, the disclosed technology uses electrical beam steering that allows the radar to scan a wide area in a short period of time. Such radars are useful in automotive and medical applications where there are space constraints and need a large area to be scanned.

In the present invention, the antenna array is designed to obtain a narrow beamwidth and a low sidelobe (local maxima of the radiation pattern) on the E-plane (plane containing the electric field vector and the direction of maximum radiation) to be steerable on the H-plane (plane containing the magnetic field vector and the direction of maximum radiation). This allows the array to scan along the horizontal plane.

FIG. 1 shows the block diagram of the proposed continuous beam steering phased array 100. In the first stage, the antenna array 101 is designed to obtain a narrow beamwidth and low sidelobe on the E-plane and to be steerable on the H-plane. This means the array can scan along the horizontal plane. Beam steering is achieved by a vector control array. Each vector controller in the vector control array can independently adjust the phase and amplitude of the signal from one of the antenna elements 103. The vector control array is designed on the PCB with PIN diodes, which results in a low system cost and a low profile. In order to compensate for the insertion loss of the vector control array and improve the sensitivity of the receiver system, a low noise amplifier (LNA) 102 is added between each antenna element and its corresponding vector controller.

Antenna Array. The design of the antenna array aims to create a non-steerable, narrow beamwidth on the E-plane (i.e., along the vertical direction) and a steerable pattern on the H-plane (i.e., along the horizontal direction), such that the radar system can perform I-D electrical scan by adjusting the vector control array.

Figure 2:
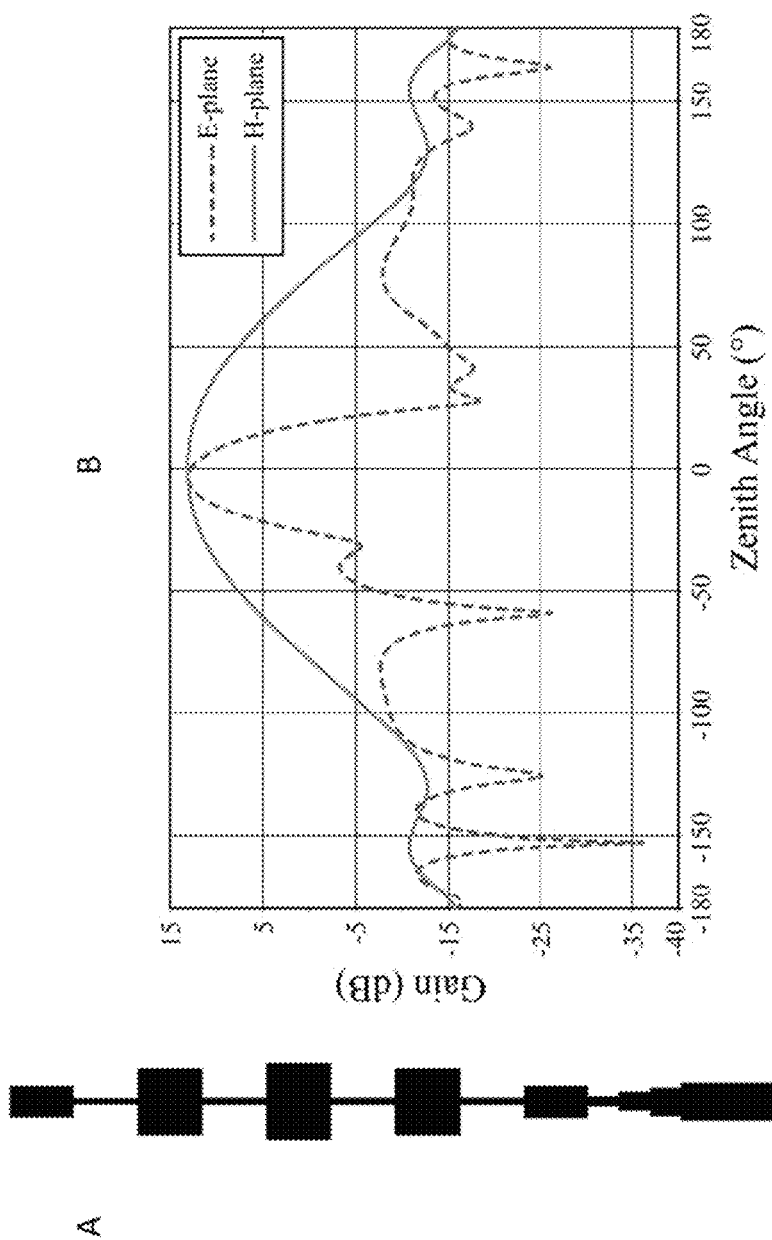
FIG. 2 depicts (A) a schematic of a series-fed Dolph-Chebychev distributed array and (B) The E-plane and H-plane patterns of the series-fed Dolph-Chebychev distributed array.

FIG. 2(A) shows one array element, which consists of five series-fed microstrip patch antennas with Dolph-Chebychev distribution, which has the minimum null-to-null beamwidth for a specified sidelobe level and equal magnitude for all the sidelobes [6]. FIG. 2(B) shows the radiation pattern of one array element. The E-plane pattern has a narrow beam directing to 0°, and the H-plane pattern has a wide beam. In this phased array, 6 series-fed patch arrays are distributed horizontally, the distance between each element is 3λ/4. By feeding these 6 antenna elements with different phases and amplitudes, continuous beam steering can be realized.

Vector Controller. Assume a complex signal: x'=exp(−j2πft−jΦ(t)), where f is the frequency and Φ(t) is the modulation phase. By multiplying x with w=R exp(jϕ), the result y is the original signal x modulated by amplitude R and phase ϕ.

$$y = Re^{-j(2\pi ft + \varnothing(t) - \phi)} \quad (1)$$

The real part of y, which is the combination of the in-phase and quadrature components, is:

$$Re\{y\} = R\ \cos(2\pi ft + \varnothing(t) - \phi) = \quad (2)$$
$$R\ \cos\phi\ \cos(2\pi ft + \varnothing(t)) + R\ \sin\phi\ \sin(2\pi ft + \varnothing(t))$$

Figure 3:
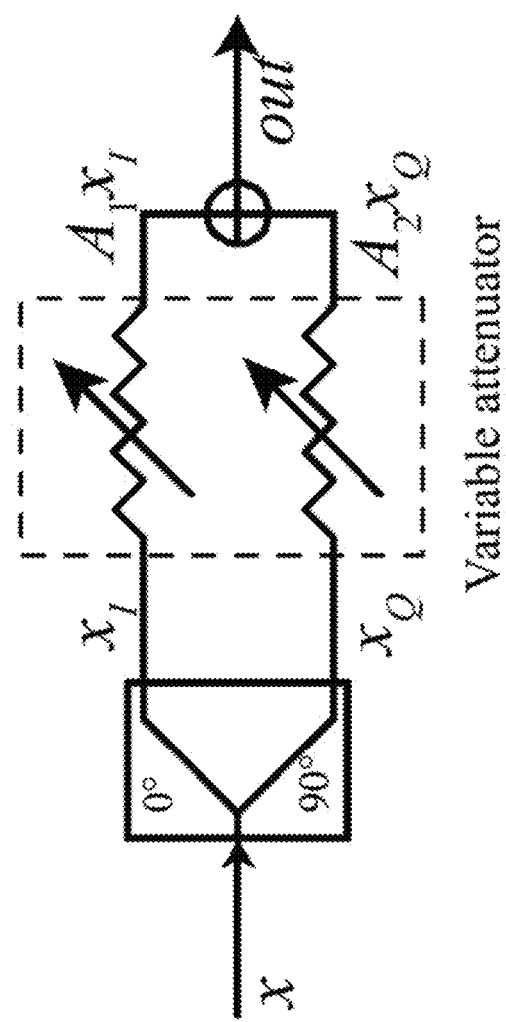
FIG. 3 depicts a schematic of the principle of the vector controller of the present invention.

This suggests that amplitude and phase control can be easily realized through a vector controller shown in FIG. 3. The input signal x is divided into in-phase signal $x_I=\sin(2\pi ft+\varnothing(t))$ and quadrature signal $x_Q=\cos(2\pi ft+\varnothing(t))$ by a quadrature power divider. After passing through the variable attenuators, the in-phase signal is attenuated by $A_1=R\cos\phi$ and the quadrature signal is attenuated by $A_2=R\sin\phi$. After combing these two signals, the output of the vector controller will be the same as (2), realizing an amplitude change of R and a phase shift of ϕ to the input signal x.

Constant Phase Shift Variable Attenuator. As mentioned above, two attenuators are used in one vector controller. In order to realize the function of the vector controller, the phase shift of a single attenuator should be constant when the attenuation changes.

Figure 4:
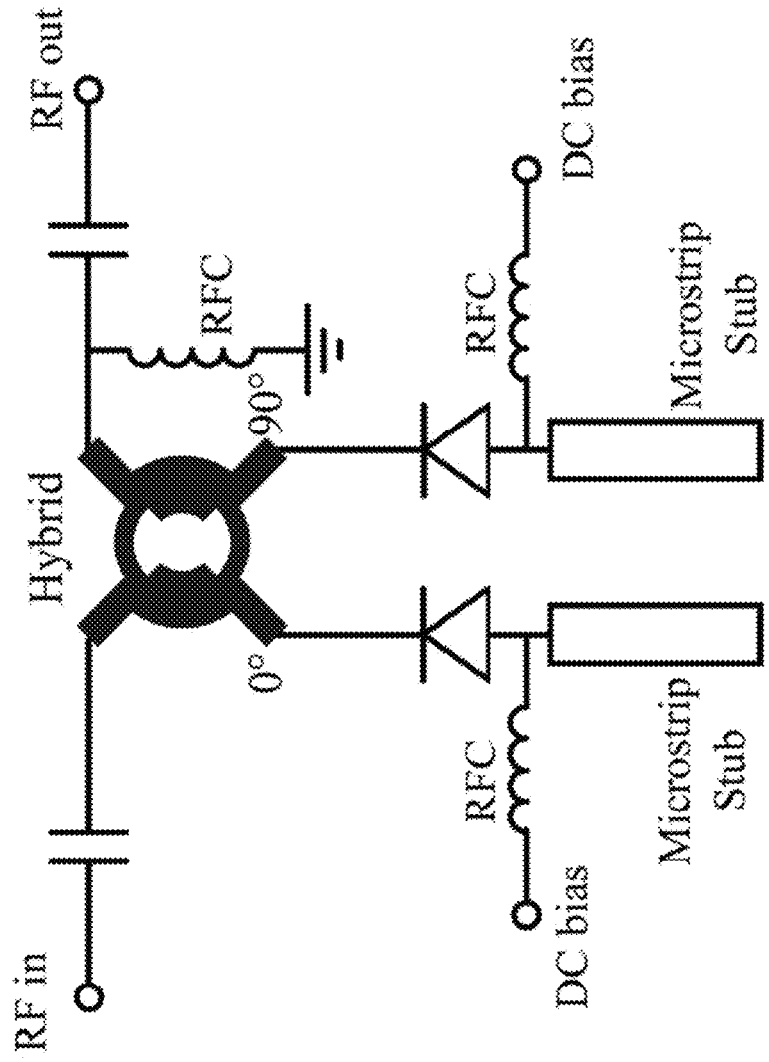
FIG. 4 depicts a schematic of the reflection-type attenuator of the present invention.

A constant-phase-shift variable attenuator is designed in this paper. FIG. 4 is the schematic of this attenuator, which is a reflection-type attenuator with good impedance matching at both the input and output because of its symmetric structure [7]. The two diodes used in this attenuator are PIN diodes. A PIN diode is a diode with a wide, undoped intrinsic semiconductor region between a p-type semiconductor and an n-type semiconductor region. The p-type and n-type regions are typically heavily doped because they are used for ohmic contacts.

The wide intrinsic region is in contrast to an ordinary PN diode. The wide intrinsic region makes the PIN diode an inferior rectifier (one typical function of a diode), but it makes the PIN diode suitable for attenuators, fast switches, photodetectors, and high voltage power electronics applications.

Figure 5:
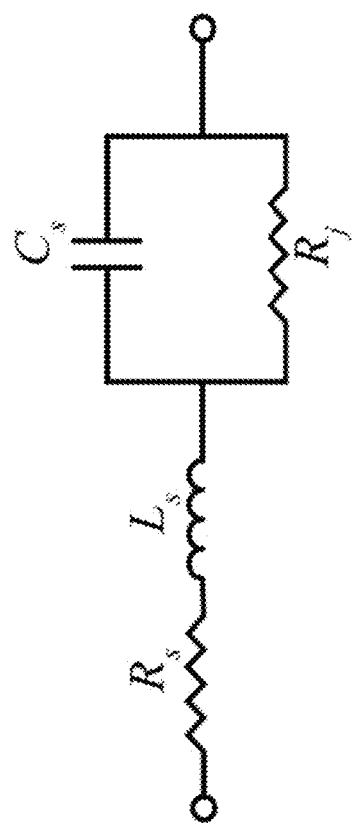
FIG. 5 depicts a schematic of the equivalent circuit model for the PIN diode.

A PIN diode obeys the standard diode equation for low-frequency signals. However, at higher frequencies, the diode can be modeled as a resistor $R_j$ with some parasitic capacitance and inductance, as shown in FIG. 5. $C_s$, $L_s$, and $R_s$ are parasitic capacitor, inductor and resistor respectively. $R_j$ is the intrinsic layer resistance of PIN diode, the value of $R_j$ can be controlled by DC bias current [9]. This is the key to realize a variable attenuator.

The operation of the reflection-type attenuator can be explained as follows. When $R_j \cong 50\Omega$, since the hybrid output ports are matched, all the RF signal is absorbed by the PIN diodes, and it is not transmitted to "RF out" at the isolation port of the hybrid. Thus, attenuation in this situation is the maximum. When decreasing the diode resistance to near 0 or increasing it to a very large value by changing the bias current, the RF signal will be completely reflected at the ports of the PIN diodes and transmitted to the "RF out" port. In this case, the attenuation is the minimum.

Since the PIN diode is not a perfect resistor at high frequencies, it has parasitic capacitor and inductor. The RF signal passes through the PIN diode will have different phase shifts with different $R_j$. If $R_j$ is very small, it will short the parasitic capacitor, and the parasitic inductor will contribute to the phase shift. On the other hand, if $R_j$ is very large, the parasitic capacitor will also contribute to the phase shift. However, for the reflection-type attenuator, the phase shift will be constant.

Figure 6:
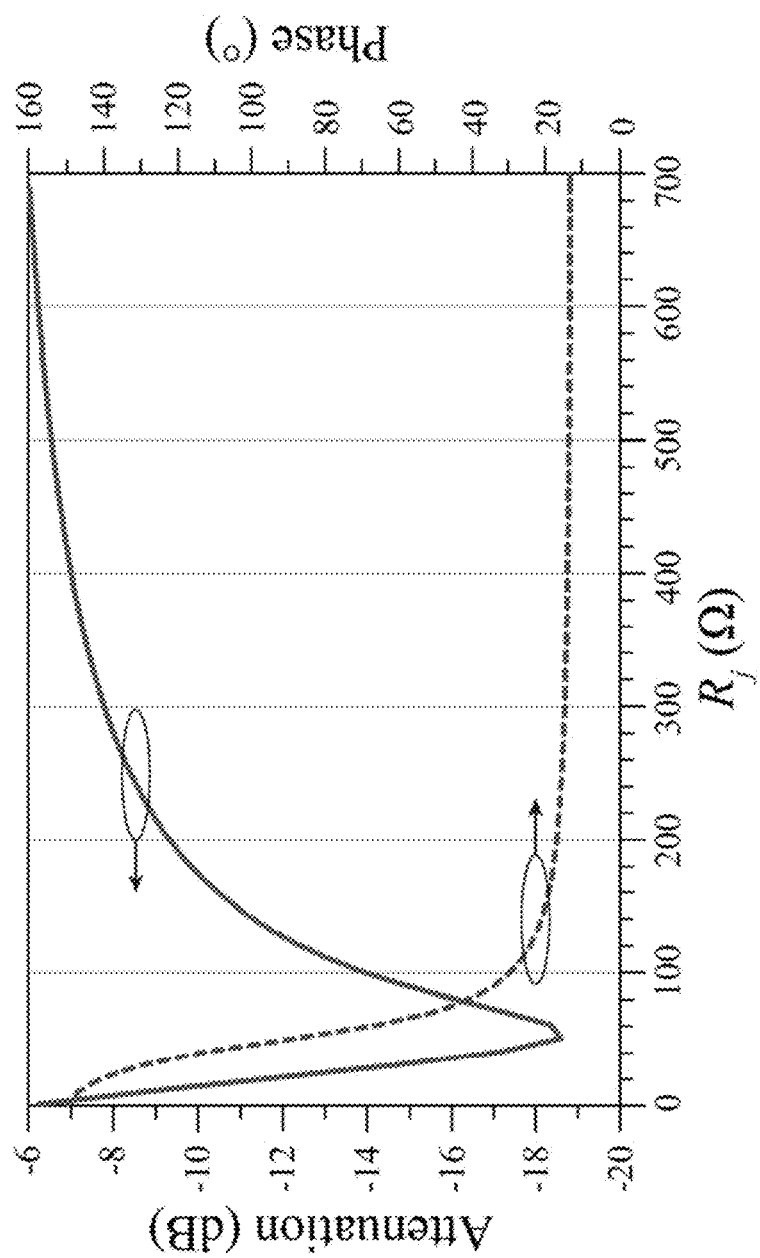
FIG. 6 depicts a graph showing attenuation and phase of the attenuator according to the change of the intrinsic layer resistance at 24 GHz.

FIG. 6 shows the simulation result of the reflection-type attenuator at 24 GHz with different $R_j$ and realistic parasitics. The attenuation is the maximum when $R_j$ is about 50Ω, and the attenuation will decrease when the value of RR is either increased or decreased from 50Ω. The phase is stable when $R_j$ increases from 100Ω to 700Ω.

The simulation of the phased array is performed on a commercial FDTD simulation tool. The different patterns of the array are simulated based on the different phase and amplitude values generated by the vector control array.

FIG. 7 shows the simulated patterns of the continuous beam steering phased array. FIG. 7(A) is the E-plane pattern of the phased array, which has a narrow beamwidth of 22.8°. Due to the Dolph-Chebychev distribution, the sidelobe level on the E-plane can reach to −16.4 dB. FIG. 7(B) is the H-plane pattern of the array. The main beam can be tuned to different directions by adjusting the phase differences of each antenna element through the vector control array. The direction of the beam can be tuned continuously since the phase of each vector controller can be adjusted continuously. Table I reports the phase and amplitude values to achieve FIG. 7(B) in simulation.

TABLE 1

Phase and Amplitude Values to Achieve FIG. 7(B).

| Direction | | A1 | A2 | A3 | A4 | A5 | A6 |
|---|---|---|---|---|---|---|---|
| −30° | Phase | 0° | 135° | 270° | 45° | 180° | 315° |
| | Amplitude | 1 | 1 | 1 | 1 | 1 | 1 |
| −15° | Phase | 0° | 70° | 140° | 210° | 280° | 350° |
| | Amplitude | 1 | 1 | 1 | 1 | 1 | 1 |
| 0° | Phase | 0° | 0° | 0° | 0° | 0° | 0° |
| | Amplitude | 1 | 1 | 1 | 1 | 1 | 1 |
| 15° | Phase | 350° | 280° | 210° | 140° | 70° | 0° |
| | Amplitude | 1 | 1 | 1 | 1 | 1 | 1 |
| 30° | Phase | 315° | 180° | 45° | 270° | 135° | 0° |
| | Amplitude | 1 | 1 | 1 | 1 | 1 | 1 |

Figure 8:
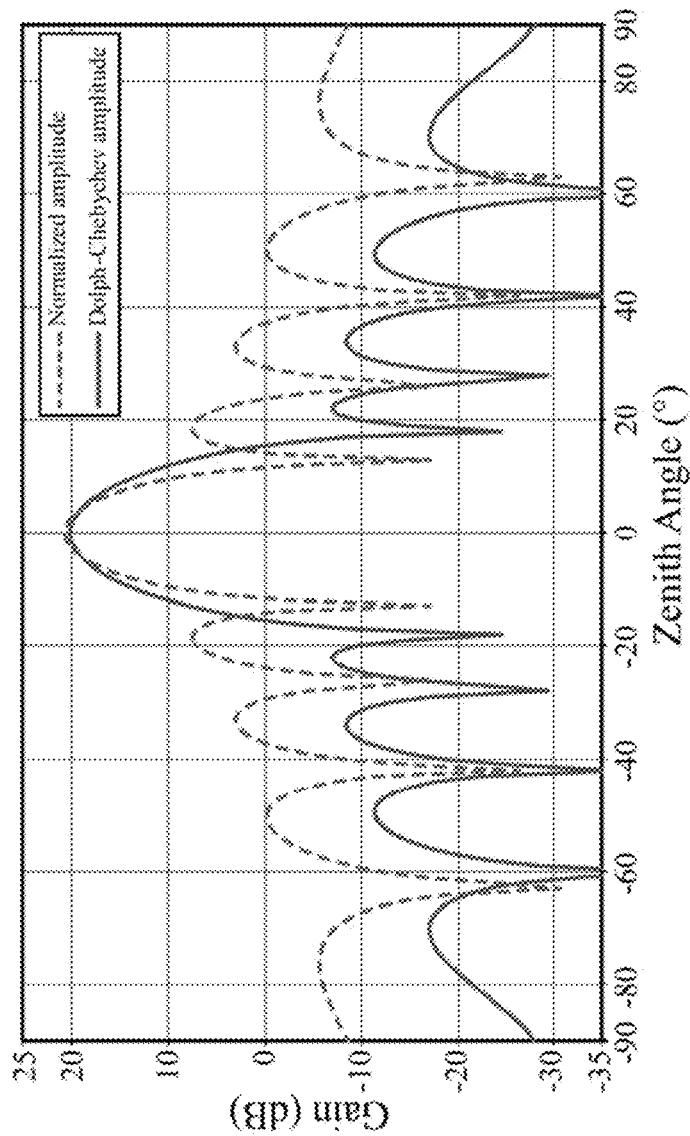
FIG. 8 depicts a graphical display of the pattern of the array with normalized amplitude feed and the pattern of the array with Dolph-Chebychev amplitude feed.

In FIG. 7(B), the direction of the beam is tuned only by adjusting the phase of each antenna element. In this proposed array, the vector control array can not only change the phase of the each antenna element, but also adjust the amplitude of each antenna element. With independent phase and amplitude control, the array can be used to form more complex or more promising patterns in radar applications. FIG. 8 is one of the examples to form a pattern with much lower sidelobes using Dolph-Chebychev amplitude distribution. Table II is the phase and amplitude values in the simulation to achieve FIG. 8. The pattern with dashed line represents the pattern generated with the same amplitude for every antenna element. The pattern formed by the amplitudes based on Dolph-Chebychev distribution is shown as solid line in FIG. 8. The sidelobe of the Dolph-Chebychev distribution pattern is almost 15 dB lower than that created by normalized amplitude.

TABLE 2

Phase and Amplitude Values to Achieve FIG. 8.

| | | A1 | A2 | A3 | A4 | A5 | A6 |
|---|---|---|---|---|---|---|---|
| Normalized | Phase | 0° | 0° | 0° | 0° | 0° | 0° |
| | Amplitude | 1 | 1 | 1 | 1 | 1 | 1 |
| Dolph-Chebychev | Phase | 0° | 0° | 0° | 0° | 0° | 0° |
| | Amplitude | 0.36 | 0.72 | 1 | 1 | 0.72 | 0.36 |

Figure 9:
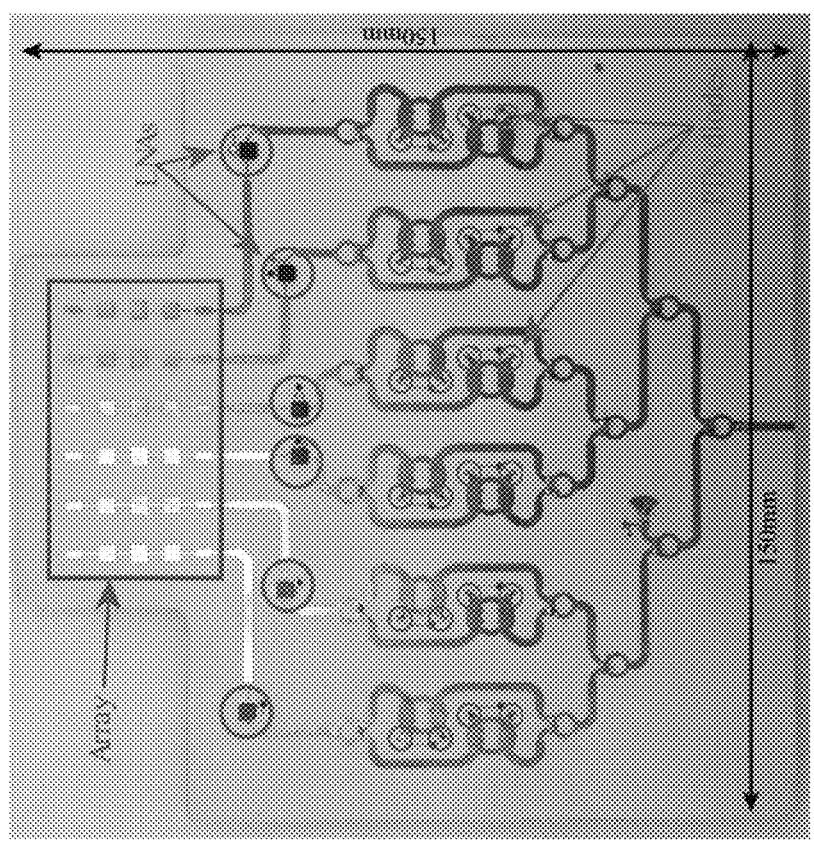
FIG. 9 depicts a photograph of a proposed phased array of the present invention.

FIG. 9 is a photo of the phased array of the present invention for a radar receiver. This array is fabricated on a Rogers 4350B board, and the size of the board is about 150 mm×150 mm.

It is thus an embodiment of the present invention to provide a 24-GHz phased-array for indoor smart radar is proposed. This array consists of 6 horizontally placed antenna elements. Each antenna element is a vertically placed 5-element series-fed microstrip patch array. Simulation of the 5-element patch array shows it has a −16.4 dB sidelobe level and 22.8° beamwidth on the E-plane. The beam of the system can be continuously steered to different directions on the H-plane through a novel vector control array. Each element of the vector control array can independently adjust the phase and amplitude of the corresponding element in the horizontally placed linear array. The principle of the vector controller is illustrated, and the constant-phase-shift attenuator used in the vector controller is designed and simulated. In addition, by adjusting the phase and amplitude at the same time, this array can realize more complex beam forming, such as achieving a much lower sidelobe. This is very useful for indoor smart radar applications. Because no high-frequency phase shifter is used, the proposed phased-array system based on PIN diodes features a lower cost than conventional solutions.

REFERENCES

[1] D. M. Grimes and T. O. Jones, "Automotive radar: A brief review," *Proceedings of the IEEE*, vol. 62, no. 6. pp. 804-822, June 1974.

[2] M. Vossiek, L. Wiebking, P. Gulden, J. Wieghardt, C. Hoffmann, and P. Heide, "Wireless local positioning," *Microwave Magazine, IEEE*, vol. 4, no. 4. pp. 77-86, February 2003.

[3] C. Li, V. M. Lubecke, O. Boric-Lubecke, and J. Lin, "A Review on Recent Advances in Doppler Radar Sensors for Noncontact Healthcare Monitoring," *Microwave*

Theory and Techniques, IEEE Transactions on, vol. 61, no. 5. pp. 2046-2060, May 2013.

[4] C. Gu, R. Li, H. Zhang, A. Y. C. Fung, C. Torres, S. B. Jiang, and C. Li, "Accurate Respiration Measurement Using DC-Coupled Continuous-Wave Radar Sensor for Motion-Adaptive Cancer Radiotherapy," *Biomedical Engineering, IEEE Transactions on*, vol. 59, no. 11. pp. 3117-3123, October 2012.

[5] H. J. Visser, *Array and Phased Array Antenna Basics*. Chichester, U.K.: Wiley, 2006.

[6] H. L. V. Trees, *Optimum Array Processing*, 1st ed. New York: Wiley-Interscience, 2002.

[7] W.-T. Kang, I.-S. Chang, and M.-S. Kang, "Reflection-type low-phase-shift attenuator," *Microwave Theory and Techniques, IEEE Transactions on*, vol. 46, no. 7. pp. 1019-1021, August 1998.

[8] S. Walker, "A low phase shift attenuator," *Microwave Theory and Techniques, IEEE Transactions on*, vol. 42, no. 2. pp. 182-185, February 1994.

[9] I. Bahl and P. Bhartia, *Microwave Solid State Circuit Design*. New York: Wiley, 1988, pp. 667-670.

What is claimed is:

1. A phased array radar, comprising:
   an antennae array comprising at least six series-fed antennae;
   a vector controller comprising a quadrature power divider, a power combiner, a first attenuator and a second attenuator;
   one or more low noise amplifiers (LNAs), wherein the one or more low noise amplifiers are positioned between the antennae array and the vector controller;
   one or more PIN diodes; wherein
      both of the first attenuator and the second attenuator maintain a constant phase shift when attenuation changes, and
      each of the first and second attenuators are a reflection-type attenuator having similar impedance matching at both the input and output.

2. The phased array radar of claim 1, further comprising a non-steerable pattern on the E-plane and steerable pattern on the H-plane.

3. The phased array radar of claim 1, wherein the antennae are five-element series-fed microstrip patch antennae.

4. The phased array radar of claim 1, wherein the vector controller is capable of attenuating amplitude and phase control.

5. A method of controlling a phased array radar, comprising:
   independently adjusting the phase and amplitude of each antennae within an antennae array comprising at least six series-fed antennae via
      a vector controller comprising a quadrature power divider, a power combiner, a first attenuator, and a second attenuator, and
      a low noise amplifier (LNA) operatively positioned between the vector controller and the each antennae within the antennae array;
   wherein the first attenuator and second attenuator maintain a constant phase shift when attenuation changes.

6. The method of claim 5, wherein both the first attenuator and the second attenuator are capable of amplitude modulation.

7. The method of claim 5, further comprising operating one or more PIN diodes for reflection-type attenuation.

8. The method of claim 5, further comprising steering the antenna array on the H-plane by adjusting the vector controller.

* * * * *